358-140. OR 3,109,892 SR

Nov. 5, 1963 P. B. HELSDON 3,109,892

TELEVISION SIGNAL CONVERTING APPARATUS

Filed Oct. 13, 1960 3 Sheets-Sheet 1

T5055

INVENTOR
Peter Bennett Helsdon
BY
Baldwin & Wight
ATTORNEYS

Nov. 5, 1963 P. B. HELSDON 3,109,892

TELEVISION SIGNAL CONVERTING APPARATUS

Filed Oct. 13, 1960 3 Sheets-Sheet 2

INVENTOR
Peter Bennett Helsdon
BY
Baldwin & Wight
ATTORNEYS

Nov. 5, 1963 P. B. HELSDON 3,109,892

TELEVISION SIGNAL CONVERTING APPARATUS

Filed Oct. 13, 1960 3 Sheets-Sheet 3

INVENTOR
Peter Bennett Helsdon
BY
Baldwin & Wight
ATTORNEYS 3,109,892
Patented Nov. 5, 1963

3,109,892
TELEVISION SIGNAL CONVERTING APPARATUS

Peter Bennett Helsdon, Chelmsford, England, assignor to The Marconi Company Limited, a British company Filed Oct. 13, 1960, Ser. No. 62,355
Claims priority, application Great Britain Dec. 15, 1959
2 Claims. (Cl. 178—6.8)

Figure 1:
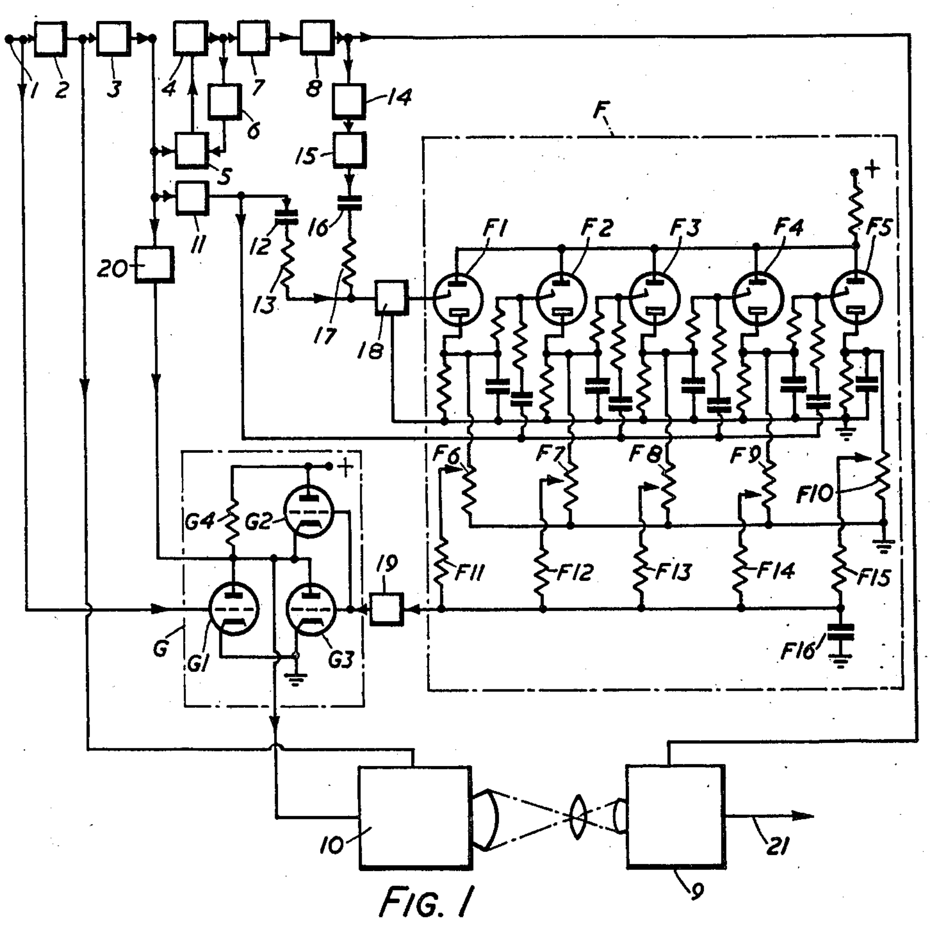

This invention relates to television signal converting apparatus, that is to say to apparatus for converting television signals derived from television apparatus operating in accordance with one set of television standards to signals suitable for television apparatus operating in accordance with a different set of television standards.

There are several different sets of television standards in use in different countries of the world. Thus, for example, the present British standard is 405 lines and 50 fields per second, whereas in the U.S.A. the standard is 525 lines at 60 fields per second. Whenever a program televised by a system operating with one set of standards is required to be reproduced by a system operating with another set of standards, the television signals produced by the first system must be converted into signals which can be utilised by the second system. This requirement frequently arises in connection with the recording of television signals to produce records for export, e.g. when a program televised by a normal British system has to be recorded on television recording tape in a form such that it can be "played off" by a normal American system. In such cases conversion of the signals has to be done.

Conversion of television signals is, of course, well known. Television signals in accordance with the first set of standards are reproduced by a television reproducer tube in the ordinary way and the pictures on the screen of this tube are "viewed" by a television camera system operating with the second set of standards to derive television signals for recording on tape or other utilisation. If the reproducer tube is subject to spot-wobble in any of the well known ways, and if its screen is of willemite or some other phosphor having appreciable afterglow to give a decay time of the order of one field period, and if the camera tube is a storage tube of good storage characteristics, the fact that the number of lines per field is different in the two standards does not lead to any difficulties, but, as is also known, the fact that the field periodicity is different in the two standards results in an objectionable flicker effect (when reproducing signals from the camera) at a frequency dependent upon and due to the difference between the two field frequencies. Thus, if the reproducer tube is producing pictures at the present British field frequency of 50 fields/sec. and the viewing camera is operating, in accordance with American standards, at 60 fields per second, pictures reproduced from a record of the signals derived from the viewing camera will exhibit flicker at 10 c./s. This flicker is due to an unwanted signal amplitude variation occurring at 10 c./s. and arising by reason of the fact that only five fields are produced by the reproducer tube whose pictures are being televised in the same time as that in which six fields are traversed by the second viewing camera. It is known to remove this unwanted signal amplitude variation by subjecting the television signals, at some convenient point in the television conversion apparatus, to a gain which is varied at the field difference frequency (10 c./s. in the example quoted) and in accordance with a predetermined wave shape which approximates to a saw tooth wave. Thus, if the gain of an amplifier interposed in the channel leading to the reproducer tube or interposed at a point where it receives the signals from the viewing camera, is varied in accordance with a wave of the required predetermined shape and of the field difference frequency, there will be introduced a compensating distortion which compensates for and thus substantially eliminates the undesired flicker. For further information with regard to the foregoing known proposals attention is directed to an article entitled "Conversion of Television Standards" by A. V. Lord and published in the B.B.C. Quarterly, volume VIII, No. 2, 1953. It is an object of the present invention to provide improved apparatus for reducing or eliminating this flicker.

In any television signal converting apparatus as above described, it is essential for good results that what may be termed the phase relation between the field frequency of the reproducer tube and the different field frequency in the viewing camera shall remain fixed; e.g. taking the case of a reproducer tube operated at 50 fields/sec. and a viewing camera operating at 60 fields/sec. it is essential that the beginning of the first, sixth, eleventh . . . and so on, field in the reproducer tube shall coincide exactly with the beginning of the first, seventh, thirteenth . . . and so on, field (respectively) in the viewing camera, and that the exploration of each camera field shall occupy ⅚ of the time of that of each reproducer tube field. Unless this requirement is satisfied the final output signals will be unsatisfactory and the compensating gain control above described will not operate properly. An important practical advantage of television signal conversion apparatus in accordance with this invention is, as will be seen later, that it will operate satisfactorily from the original television signals fed thereto irrespective of the frequency of the mains or other general supplies available.

Briefly, this invention relates to a television signal conversion apparatus wherein pictures reproduced on a reproducer tube by input television signals in accordance with one set of television standards having a first field frequency are televised by a viewing camera tube to produce output signals in accordance with another set of television standards having a second, different field frequency. The apparatus includes gain adjusting means and means for producing a gain control waveform for the gain adjusting means which waveform changes repetitively at a frequency equal to the difference between the two field frequencies. The means for producing a gain control waveform includes a chain counter having a cascaded succession of trigger tubes, the first of which is biased to ignite only when it receives simultaneous pulses at the two field frequencies. The counter includes a number of tubes equal to the ratio between the lowest common multiple of the field frequencies and one of the field frequencies and the tubes are connected such that each successive tube receives an input from the preceding tube including superimposed pulses occurring at the other of the field frequencies. The tubes ignite in turn for a field period for the other of said field frequencies and these tubes are connected to a combining network which combines the tube outputs to produce the gain control waveform. Preferably the gain adjusting means is a controllable amplifier which is subjected to gain control to eliminate flicker and may be an amplifier in the television signal channel preceding the reproducer tube, but it is preferred to effect gain control of an amplifier in that part of the television signal channel which follows the viewing camera tube as a somewhat higher degree of flicker elimination can be obtained in this way.

In carrying out the invention better linearity of television signal output is often obtainable from the viewing camera if "black" level in the reproducer tube is caused to be at some definite finite brightness value which is preferably adjustable, e.g. at 20% of "peak white." There is, therefore, as is known, appreciable practical advantage in arranging for control of "black" level in the reproducer tube, for example, by means of a "line-by-line back porch clamp" as known per se. If this is done and the television signal amplifier which is automatically gain controlled is an amplifier in the channel leading to the reproducer tube, a detailed proportion of the normally present so-called "back porch clamping signal" derived from said input signal should be superimposed in the gain controlled amplifier so as to appear in the output thereof after subjection to the same gain control.

Preferably the combining network includes adjustable elements each in circuit with a different tube whereby the wave shape may be adjusted by trial and error.

As in known television signal converting apparatus as hereinbefore described, the reproducer tube should be of long afterglow—of the order of one field period—and the camera tube should be of high storage—e.g. an image orthicon tube of high storage.

Figure 2:
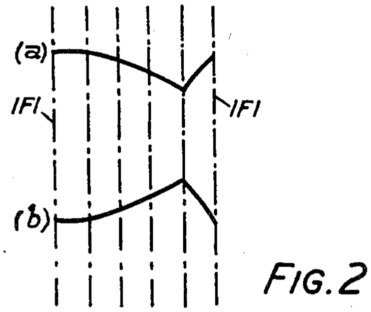
Figure 3:
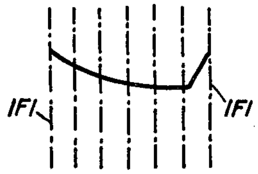
Figure 4:
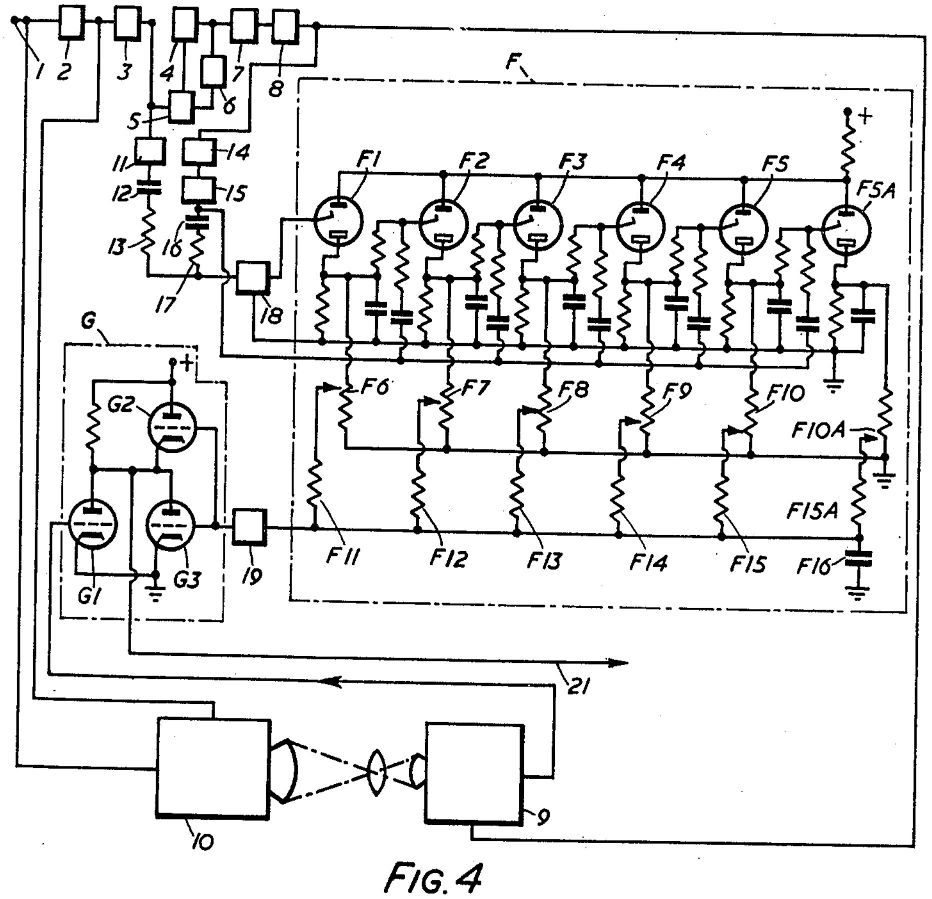
Figure 5:
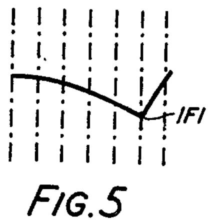
Figure 6:
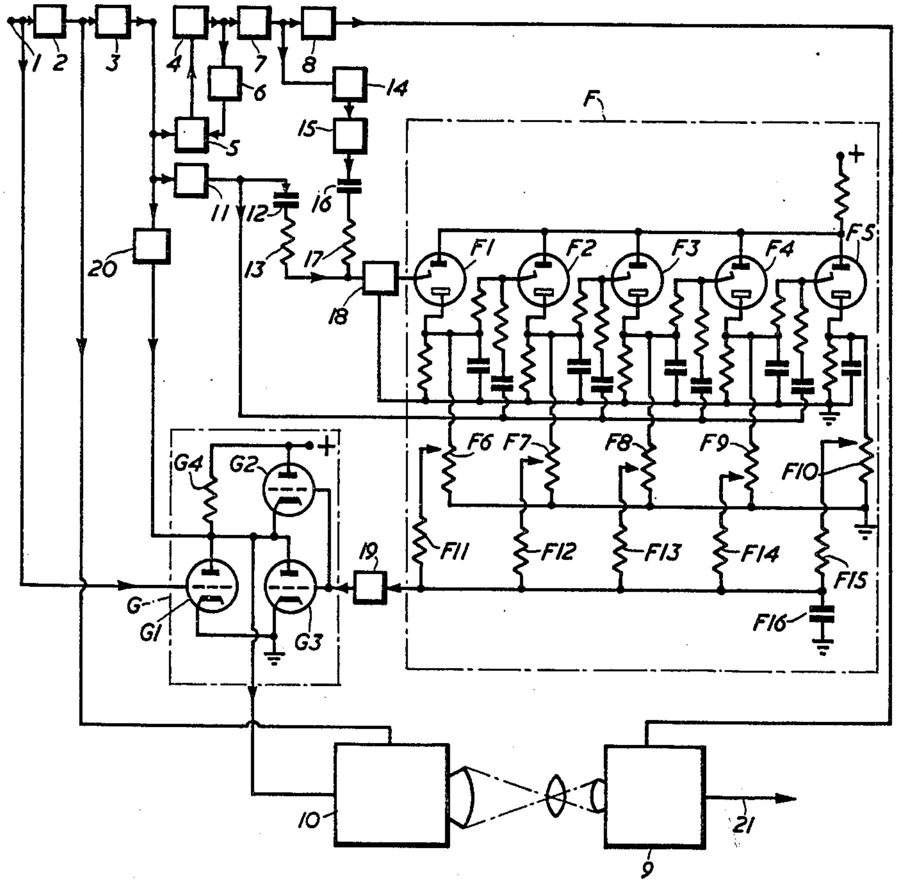

The invention is illustrated in and further explained in connection with the accompanying drawings. In the drawings FIG. 1 is a simplified diagram of one embodiment; FIGS. 2 and 3 are explanatory graphical figures; Fig. 4 is a diagram similar to FIG. 1 of a slightly preferred embodiment; FIG. 5 is an explanatory graphical figure; and FIG. 6 illustrates a detail modification which may be made either to the embodiment of FIG. 1 or to the embodiment of FIG. 4. Like references denote like parts in the figures.

In order to simplify the drawings and the description thereof, the invention is exemplified in the embodiments illustrated as applied to television signal converting apparatus for converting television signals with a field frequency of 50 per second into television signals with a field frequency of 60 per second, and FIGURES 1, 4 and 6 show embodiments which are capable only of converting in this direction. However, it will be apparent to those skilled in the art from the description which follows how these figures could be modified to convert signals with 60 fields per second into signal with 50 fields per second. In usual practice of the invention apparatus capable of converting in either direction at will (i.e. from 50 fields/sec. signals to 60 fields/sec. signals or from 60 fields/sec. signals to 50 fields/sec. signals) will be provided, together with switches to enable the apparatus appropriate to the direction of conversion required at any time to be brought into use.

Referring to FIGURE 1, television signals in accordance with British standards of 405 lines, 50 fields are applied at terminal 1. These signals are of the usual known form including video signals, line synchronising signals, frame synchronising signals and blanking signals. All the synchronising signals, that is to say all the signals other than the video signals, are separated by a known separator 2 and passed to a further known separator 3 which separates out the field pulses. A generator 4 having a free running frequency of 300 pulses per second (i.e. the common multiple of the two field frequencies) is controlled in frequency by an error signal produced by a known frequency and phase comparator 5 which receives one input from the unit 3 and its other input from a frequency divider 6 having a division factor of 6 and fed with output from the generator 4. Output from the generator 4 is fed to a further frequency divider 7 having a division factor of 5. It will be seen, therefore, that the output from the unit 7 will be at the second field frequency of 60 fields/sec. and that this output will be in substantially fixed frequency and phase relationship to the output from the unit 3 because of the control of the common multiple frequency oscillator 4 by the comparator 5. Output from the unit 7 controls a synchronising signal generator unit 8 of any convenient type known per se which controls in known manner the scanning action of an image orthicon camera tube included in a television viewing unit 9.

The tube in the unit 9, which tube should be of high storage, is focused upon the screen of a reproducer tube in a television reproducer unit 10. This reproducer tube should be one having a willemite or other screen of long afterglow of the order of one field period. The reproducer tube in the unit 10 is subjected to spot-wobble control as known per se (the means for spot-wobbling are too well known to require illustration and are presumed to be included in the unit 10) so as to eliminate line structure from the reproduced pictures.

The video signals reproduced by the tube 10 are fed thereto from the terminal 1 through a gain controlled amplifier within the chain line rectangle G and synchronising signals for scanning action in the unit 10 are fed thereto from the output of the unit 2.

The amplifier G includes three valves G1, G2 and G3 whose essential circuit connections are as shown (details such as coupling capacities and bias networks are omitted from the drawing) with the valves G2 and G3 in series and having their control grids suitably coupled together (the coupling networks are not shown but are represented for simplicity in the drawing by a direct connection) and the valve G1 in series with a high resistance G4 in a circuit which extends across the two series valves G2 and G3. As will be seen the gain of the amplifier G depends upon and is controllable by the potential on the grids of the valves G2 and G3. The video signals are applied to the grid of the valve G1 and gain control of the amplifier is effected by a saw tooth waveform as shown at (*a*) of FIGURE 2 which is produced by a gain controlling unit within the chain rectangle F. The gain controlling waveform at (*a*) of FIGURE 2 repeats itself at 10 c./s., i.e. at the difference between the two field frequencies, the space between each of the vertical chain lines in FIGURE 2 being one field period of the 50 fields/sec. frequency. The moment of occurrence of the termination of the short face of the saw tooth waveform of FIGURE 2 is when the two field pulses occur simultaneously. In FIGURE 2 the moment of ignition of tube F1 is indicated by the references IFI on the end chain lines shown. The gain of the amplifier G varies as shown by the curve (*b*) of FIGURE 2, which is the mirror image of the curve (*a*).

The gain controlling unit F is a so-called chain counter of a general nature known per se and which comprises five cold-cathode trigger tubes F1 to F5 in cascade. The first of these tubes receives two superimposed inputs, one of which is taken from the unit 3 through an amplifier 11, condenser 12 and resistance 13, and the other of which is taken from the unit 8 through a separator 14 which separates the field pulses from the output of the unit 8, an amplifier 15, a condenser 16 and a resistance 17. In the modification partly shown in FIG. 6 the input to the separator 14 is taken from the output of unit 7 instead of from the output from unit 8. This modification has the advantage of reducing the disturbance which occurs when the input signal is undergoing the operation known as "gen-locking," a procedure which for a few seconds gives a transistory change of frame frequency. The rest of the embodiment of FIG. 6 not shown therein will be exactly as in FIG. 1 or FIG. 4 (to be described later). The common end of the resistance 13, 17 is connected to the trigger electrode of the tube F1 through a D.C. bias source 1 and this source is so chosen and the whole arrangement is made such that the tube F1 ignites only when the two inputs thereto, one through the resistance 13 and the other through the resistance 17, are simultaneous. Each successive tube F2, F3, F4, F5 receives on its trigger electrode output produced from the preceding tube when that tube ignites and on the trigger electrodes of all the tubes F2 to F5 are superimposed further signals taken from the output of the amplifier 11. The trigger tubes and their associated circuit elements are so arranged that when field pulses in the outputs from the units 3 and 8 occur simultaneously, tube F1 ignites and, over the period elapsing before such simultaneity occurs again, the tubes F2 to F5 ignite in succession, each for one field period from the unit 3 and only one at a time. The outputs from the trigger tubes are combined by means of a network consisting of adjustable potentiometers F6 to F10 and resistances F11 to F15, together with a storage or integrating condenser F16. The sliders on the potentiometers are preferably made adjustable and the resistances F11 to F15 may also be made adjustable, though this is not shown in the figure. It will be apparent that by adjusting the elements in the combining network the contributions of the individual trigger outputs to the combined waveform output may be adjusted and a waveform as shown at (*a*) in FIGURE 2 obtained. This waveform is applied to the control grids of the valves G2 and G3 through a buffer amplifier 19.

In order to obtain good linearity of response from the tube in the unit 9 it is of advantage to be able to adjust the reproducer unit 10 to bring the black level in the reproduced picture to some definite, preferably adjustable, finite value, e.g. of the order of 20% of "peak white." When this is done—means for doing this are not shown since they are well known per se—the back porch clamping signal should be superimposed on the signals in the controlled amplifier G so as to be subjected to the same gain control. In FIGURE 1 this is done by generating back porch clamping signals from the output of the unit 3 by means of a suitable known generator 20 and applying them at the anode of the valve G1. Output from the common anode point of the valves G1 and G3 is fed as video signal input to the reproducer tube in the unit 10. Converted television signals from the unit 9 are taken out for utilisation in any desired manner, e.g. for recording on magnetic tape, by lead 21 and the necessary synchronising signals may be inserted in the video signals in known manner at any convenient suitable point, e.g. within the unit 9.

The changes necessary to enable the arrangement of FIGURE 1 to convert from 60 fields/sec. signals to 50 fields/sec. signals will, for the most part, be obvious from the description given above. Clearly the counter unit F would have to have six trigger tubes in this case and the divider 6 would have to have a division factor of 5 and the divider 7 a division factor of 6. Also, it may be shown that the best shape for the gain controlling waveform will no longer be as at (*a*) of FIGURE 2—i.e. a saw tooth with a convex long face—but as shown in FIGURE 3—i.e. a saw tooth with a concave long face. As in FIGURE 2, IFI indicates the moment of ignition of the tube F1 in this case. It will be noted from FIGURE 3 that the overall length of the saw tooth is the same as that in FIGURE 2(*a*) but it is made up of six field periods at the 60 fields/sec. frequency instead of five at the 50 fields/sec. frequency. Both in FIGURE 2(*a*) and in FIGURE 3 each single field period part of the waveform is, theoretically, approximately a straight line. The waveform of FIGURE 3 is, of course, obtainable by suitable selecting or adjusting the elements in the combining network fed from the trigger tubes. As already stated, in a practical embodiment apparatus necessary to enable conversion to be effected in either direction would usually be provided with selector switches to select for use at any time the apparatus necessary for the direction of conversion then required.

The modification shown in FIGURE 4 is generally so similar to that of FIGURE 1 as to require little further description. The principal difference is that the gain controlled amplifier G is now not inserted in the channel to the reproducer unit 10 but in the channel from the camera unit 9. Accordingly the unit F has six trigger tubes F1 to F5*a* and the combining network includes six potentiometers F6 to F10*a* and six resistances F11 to F15*a*. The inputs to the unit F are reversed in FIGURE 4 as compared to the connections in FIGURE 1 and also, of course, there is no question of superimposing back porch clamping signals in the amplifier G. Accordingly the separator 20 and the connection therefrom to the amplifier G are omitted. The output waveform from the unit F is as shown in FIGURE 5 and as will be seen extends across six field periods at the 60 fields/sec. frequency. It repeats itself, of course, at 10 c./s. as before, but the longer face of the saw tooth now terminates at the time at which the two field pulses occur simultaneously, IFI again indicating the moment of ignition of tube F1 in this case. In FIGURE 4 it is preferable, though not absolutely essential, that the signals fed from the unit 9 to the amplifier G should be video signals only so that the synchronising signals are not subjected to gain control. The necessary synchronising signals may be inserted in the signal output from the amplifier G in any convenient well known manner and at any suitable point (not shown).

The arrangement of FIGURE 4 is preferred to that of FIGURE 1 in part because the anti-flicker correction is effected at the output end of the whole apparatus and may therefore more readily be adjusted to take into account any non-linearities or other peculiarities of preceding apparatus, and in part because the degree of correction given by a waveform as shown on FIGURE 5 and composed of portions each extending over one field period of the output field frequency is slightly better than that given by a waveform as shown in FIGURE 2(*a*) and composed of parts each extending over one field period of the input frame frequency. The arrangement of FIG. 4, like that of FIG. 1 may be, and preferably is, also modified as shown in FIG. 6, i.e. the input to unit 6 may be taken from unit 7 instead of from unit 8.

It will be observed that in both the illustrated embodiments operation is independent of all external synchronised voltage sources and will operate on and under the control of input signals applied at terminal 1, irrespective of the mains or other supplies available. Also the apparatus is comparatively simple and involves no mechanically moving parts.

I claim:

1. A television signal conversion apparatus wherein pictures reproduced on a reproducer tube by input television signals in accordance with one set of television standards having a first field frequency are televised by a viewing camera tube to produce output signals in accordance with another set of television standards having a second, different, field frequency comprising gain adjusting means, the gain of which is changed repetitively at a frequency equal to the difference between the two field frequencies by a gain control waveform so as substantially to eliminate flicker which would otherwise occur due to the field frequency difference, a chain counter for producing said gain control waveform having a cascaded succession of trigger tubes and means for applying input pulses at the two field frequencies to the first tube, said counter including means biasing said first tube to ignite only when said pulses are simultaneous, means for connecting each successive tube to receive input from the preceding tube and, superimposed thereon, pulses occurring at a selected one of the field frequencies, the number of tubes in the counter being the same as the ratio between the lowest common multiple of the field frequencies and the other field frequency, and the whole arrangement being such that said tubes ignite in turn, each for a field period of said selected field frequency and a combining network for combining the outputs of the tubes to produce said wave.

2. Apparatus as claimed in claim 1 wherein the combining network includes adjustable elements each in circuit with a different tube whereby the wave shape may be adjusted by trial and error.

References Cited in the file of this patent

UNITED STATES PATENTS 2,813,148 Pensak ________________ Nov. 12, 1957

OTHER REFERENCES

"Standards Converter for International TV," by A. V. Lord, Electronics, August 1953; pp. 144 to 147. (Copy in Scientific Library.)